(12) United States Patent
Davenport

(10) Patent No.: US 6,709,039 B1
(45) Date of Patent: Mar. 23, 2004

(54) AUTO-LOCKING END CAP

(75) Inventor: Mark Davenport, Macomb, MI (US)

(73) Assignee: Irvin Automotive Products, Inc., Auburn Hills, MI (US)

( * ) Notice: Subject to any disclaimer, the term of this patent is extended or adjusted under 35 U.S.C. 154(b) by 0 days.

(21) Appl. No.: 10/242,013

(22) Filed: Sep. 12, 2002

(51) Int. Cl.[7] ................................................. B60R 5/04
(52) U.S. Cl. ............................ 296/37.16; 160/323.1; 160/DIG. 2
(58) Field of Search ........................ 296/24.1, 37.16, 296/98; 160/370.22, 323.1, 324, 325, 326, DIG. 2, DIG. 10; 248/268

(56) References Cited

U.S. PATENT DOCUMENTS

| | | |
|---|---|---|
| 4,139,231 A | 2/1979 | Lang et al. |
| 4,220,367 A | 9/1980 | Gale et al. |
| 4,399,857 A | 8/1983 | Honma |
| 4,668,001 A | 5/1987 | Okumura et al. |
| 4,781,234 A | 11/1988 | Okumura et al. |
| 5,464,052 A | 11/1995 | Wiezcorek et al. |
| 5,618,077 A * | 4/1997 | Ament et al. ............ 296/37.16 |
| 5,676,415 A | 10/1997 | Ament et al. |
| 5,813,449 A * | 9/1998 | Patmore et al. ......... 296/37.16 |
| 5,857,725 A | 1/1999 | Croke et al. |
| 5,934,354 A | 8/1999 | Price et al. |
| 5,961,172 A * | 10/1999 | Ament et al. ........... 296/37.16 |
| 6,039,105 A | 3/2000 | Patmore et al. |
| 6,125,908 A * | 10/2000 | Ament et al. ........... 296/37.16 |
| 6,457,688 B1 * | 10/2002 | Welfonder ............... 160/323.1 |

* cited by examiner

Primary Examiner—Jason Morrow
(74) Attorney, Agent, or Firm—Dinnin & Dunn, P.C.

(57) ABSTRACT

The present invention provides a vehicle roller assembly for an extensible shade or barrier net, and an auto locking end cap assembly for a vehicle roller assembly. The end cap includes a mounting cap positioned at an end of a rotatable shade spindle. The cap body has an end plate and is reciprocable between a retracted position and an extended position. A coupling member having a finger member is positioned at least partially within the end cap assembly and has a cutout region proximate an end. When the cap body is moved toward its retracted position, the cutout region is exposed, and capable of engaging a portion of a securing member in a vehicle interior. A biasing member biases the cap body toward its extended position, engaging two elements of a locking means. The locking means includes a boss and a cavity, a mating of which secures the cap body against lateral displacement and axial rotation.

16 Claims, 3 Drawing Sheets

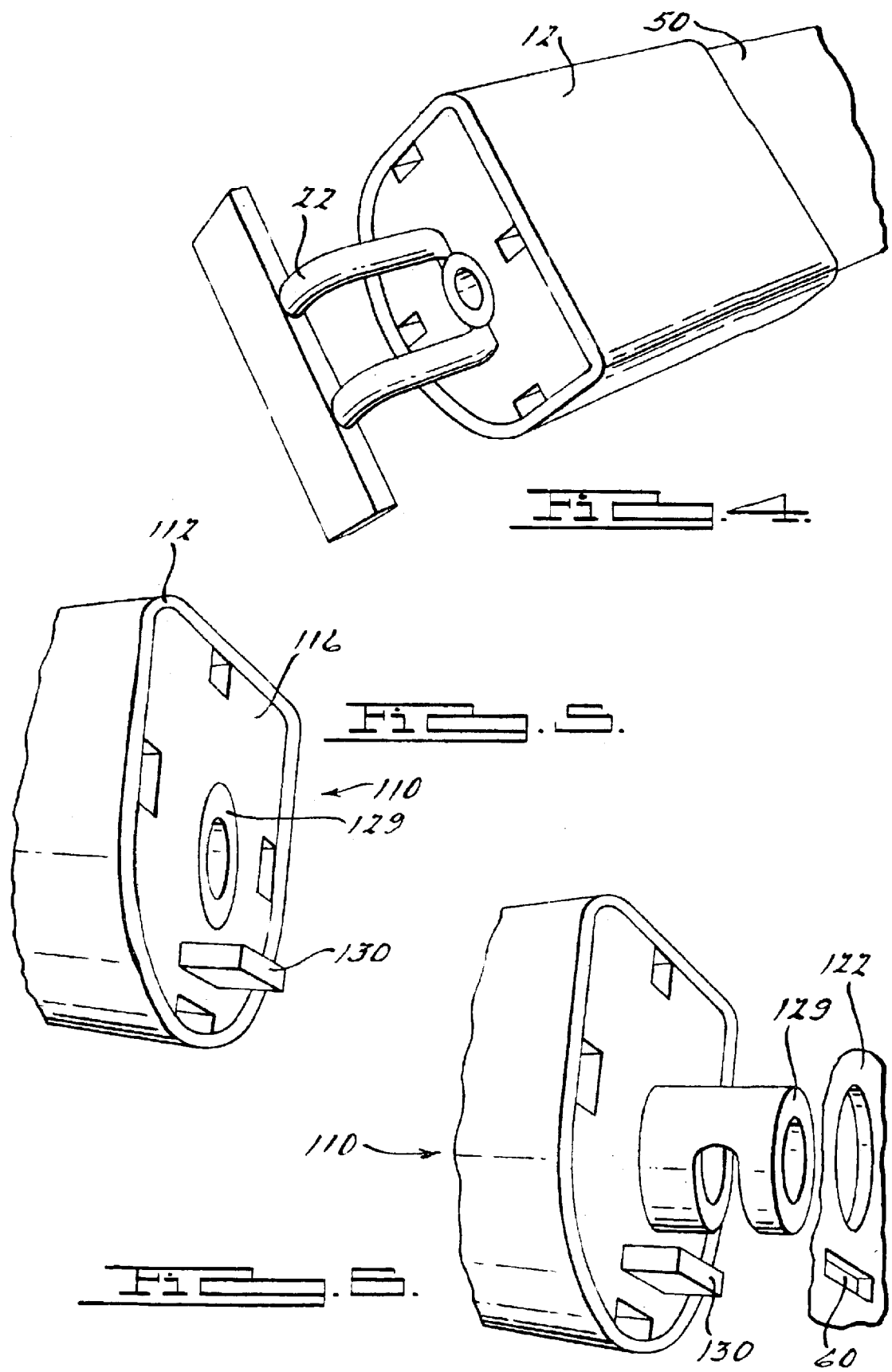

AUTO-LOCKING END CAP

TECHNICAL FIELD

The present invention relates generally to shade roller assemblies for automobile storage compartments, and more particularly to such an assembly having an end cap that is automatically locking with a vehicle interior member.

BACKGROUND OF THE INVENTION

Shade rollers are well known in the art, and some designs have been very successful over the years. Typically used in SUV's (Sport Utility Vehicles), a shade roller allows the cargo area to be obscured from view and restrains cargo in the cargo area from projectile motion in accidents or sudden stops. These shades are typically drawn from a roller cassette anchored adjacent the cargo area, either directly behind the rear seat (rear pull) between the trim panels of the rear cargo area, or along one trim panel of the cargo area (side pull). In one common design, end caps are mounted to the ends of the shade roller assembly or the roller cassette for securing the assembly in the storage area of the vehicle. When positioning large bulky items in the cargo storage area, or for other reasons, it may be desirable to remove the roller shade assembly from its mounting position. For circumstances such as these, engineers have developed end caps for shade assemblies that are spring-loaded or otherwise designed for relatively quick and easy installation and removal of the shade assembly from the vehicle.

A related concern for designers has been combating the tendency for the shade mounting apparatus to dislodge when the shade roller assembly itself rotates, or is jolted or bumped in some fashion. Various mechanisms have been proposed and developed for securing the mounting apparatus to the sidewalls of the vehicle. One such device is presented in U.S. Pat. No. 4,399,857 to Honma et al., entitled "Roller Assembly For Fitting Device For Use In A Roller Blind." Honma describes a roller assembly fitting device for use in a roller blind in which a pivot is selectively locked after the roller assembly is set up in the permanent position, preventing the roller assembly from falling down. Honma's use of a pivot retractably mounted in a sleeve is one potential design option, however, the device is relatively complex.

An additional challenge for designers results from the inconsistency in cargo space dimensions among different vehicle models, and in particular even among different individual vehicles of the same make and model. Imperfection in design and manufacturing processes ensures that even vehicles manufactured and assembled at the same facilities will exhibit myriad differences in structural dimensions. Designers have made numerous attempts to deal with this problem. One device directed to accommodating various vehicle interior widths is described in U.S. Pat. No. 5,857,725 to Croke et al. Croke is entitled "Shade Assembly Mount For Vehicle Compartment." Croke has first and second attachment members positioned at opposed ends of a shade roller assembly. Croke states that the first attachment member is releasably secured to a first bracket at a fixed point, while a second bracket supports the second attachment member at varying points, depending on the width of the vehicle interior. The Croke specification further explains that the second attachment member adjusts within its bracket as necessary, allowing the shade assembly to accommodate various vehicle interior widths. The present invention is directed to a more secure and yet user-friendly solution to the installation of roller shades. Specifically, it is an object of the present invention to provide a device which allows for easy installation and removal of a shade roller while providing a secure and automatic locking feature.

SUMMARY OF THE INVENTION

In one aspect, an end cap assembly for an extensible vehicle barrier member is provided. The end cap includes a cap member movable axially from a first position to a second position, and a biasing member biasing the cap member toward its first position. A finger member is provided and is at least partially within the cap member, and defines a recess located proximate an anterior end of the finger member. The anterior end protrudes from an end face of the cap member when the cap member is at its second position. A mounting member is positioned in a vehicle interior and has a region substantially complementary to the recess. The cap member is engageable with the mounting member when the cap body is in its second position, and a portion of the mounting member matingly engages a slot defined by the end face of the cap member.

In another aspect, a removable vehicle roller shade assembly for covering a storage compartment of a vehicle is provided. The assembly includes a rotatable spindle attached to a flexible body. The assembly further includes at least one mounting cap mounted at an end of the rotatable spindle and having a cap body with an end plate. The cap body is reciprocable between a retracted position and an extended position. A coupling member is positioned at least partially within the cap body and defines a cutout region located proximate a first end. The first end and the cutout region protrude from the end piece when the cap body is at the retracted position. The assembly further includes a securing member affixed to a vehicle interior structure. The securing member has a region that is engageable with the cutout region. The assembly also includes a biasing member that biases the cap body toward the extended position, and a locking means including a first element located on a vehicle trim panel, and a second element located on the cap body. The two elements of the locking means are engageable in a substantially mating relationship when the cap body approaches the extended position.

BRIEF DESCRIPTION OF THE DRAWINGS

FIG. 4 is a perspective view illustrating the auto-locking end cap in its fully assembled state;

FIG. 5 is a perspective view of a second embodiment of the present invention;

FIG. 6 is a perspective view similar to FIG. 5 illustrating a finger member in an extended position.

DETAILED DESCRIPTION

Figure 1:
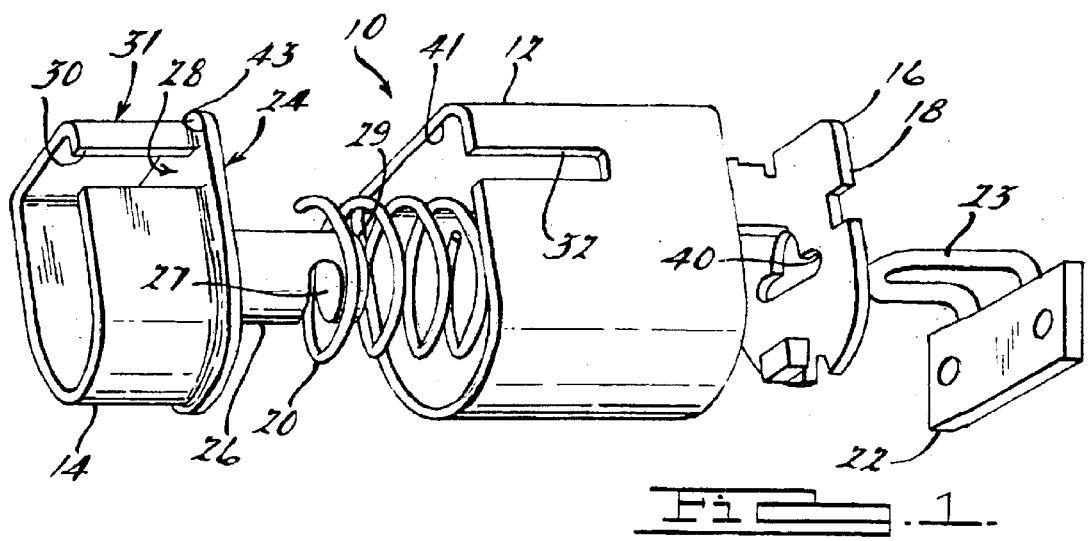
FIG. 1 is an exploded view of an auto-locking end cap according to a first embodiment of the present invention.

Referring to FIG. 1, there is shown an end cap assembly 10 for an extensible vehicle security member according to a preferred embodiment of the present invention. It should be appreciated that the present description, while focusing on "shade" members, shade assemblies, and the like, is equally applicable to other extensible members, for instance, "barrier nets." Barrier nets are flexible nets, preferably nylon or fabric, which may be wrapped around a spindle and pulled out to extend over a storage compartment in a vehicle. Alternatively, the nets or shades described herein may be extended vertically to separate the storage compartment from the rest of the vehicle interior, for instance, when articles are stored loosely in the compartment, or when pets are transported therein. End cap assembly 10 includes a hollow cap body 12, a coupling member 14 that is positionable in cap body 12, and an end plate 16. Assembly 10 further includes a biasing member 20, preferably a conventional metallic coil spring, and a securing member 22, which preferably includes an arcuate portion 23. Other than coil spring 20, all of the components of assembly 10 are preferably molded plastic, however, the components might be constructed of metal or some other suitable material without departing from the present invention. Cap body 12 is preferably hollow and substantially D-shaped in cross section; however, it might be manufactured to have a cylindrical, square, or some other cross section. Likewise, end plate 16 preferably has a substantially D-shaped cross section, allowing a matched fit with cap body 12. End plate 16 is preferably attachable to cap body 12 along its outer periphery 18, however, those skilled in the art will appreciate that cap body 12 and end plate 16 could alternatively be molded as a single part, rather than distinct components.

Coupling member 14 is preferably a unitary plastic piece and includes a stop plate 24, an extension 26, and a hollow body 31, and is preferably positionable at least partially within hollow cap body 12. The dimensions of stop plate 24 and body 31 should be slightly smaller than the dimensions of cap body 12 to allow a smooth reciprocation between the two elements, as explained below. Extension 26 is preferably substantially cylindrical and includes a cutout 27 preferably located proximate an anterior end 29. Coil spring 20 preferably encircles extension 26, is positioned between stop plate 24 and end plate 16, and can be compressed between the two plates to bias the plates 24 and 16 apart from one another, consequently biasing coupling member 14 and cap body 12. Cap body 12 is thus reciprocable between a retracted position and an extended position and biased by coil spring 20 toward its extended position. Cap body 12 and coupling member 14 preferably each have a lip 41 and 43, respectively. Cap body 12's lip 41 extends into the hollow interior of cap body 12, whereas lip 43 of coupling member 14 extends outward in a radial direction from coupling member 14 and is preferably the outer edge of stop plate 24. Thus, when coupling member 14 is positioned within cap body 12, lips 41 and 43 engage one another, preventing coil spring 20 from forcing cap body 12 out of engagement with coupling member 14. End plate 16 preferably includes a centrally positioned aperture 40, through which the anterior end 29 of extension 26 can extend when coil spring 20 is compressed and cap body 12 is moved toward its retracted position.

A conventional shade spindle (not shown) is preferably positioned adjacent a backside 28 of stop plate 24, and preferably rotatably attached thereto. A bearing assembly might be utilized to attach the shade spindle to stop plate 24, the spindle might be allowed to freely rotate in a seat integrally molded with or attached to coupling member 14, or some other suitable attachment method might be used. The shade spindle should include a flexible shade panel windable about a spindle body to cover or uncover a vehicle storage compartment in a manner well known in the art. Coupling member 14 and cap body 12 preferably have slots 32 and 30 which overlay one another when coupling member 14 is positioned within cap body 12, and allow the shade panel to pass freely therethrough when it is retracted or extended. Because coupling member 14 is preferably secured against motion in an axial direction relative to cap body 12, axial pressure on cap body 12 causes cap body 12 to move in an axial direction relative to the spindle and coupling member 14. In an alternative embodiment, coupling member 14 is attached to the shade spindle in such a manner that some degree of axial travel is permitted. When sufficient pressure is applied to end plate 16 coil spring 20 is compressed, allowing cap body 12 to be pushed in an inward direction (toward a vehicle centerline), and causing the anterior end 29 of extension 26 (and eventually cutout 27) to protrude from end plate 16.

Figure 2:
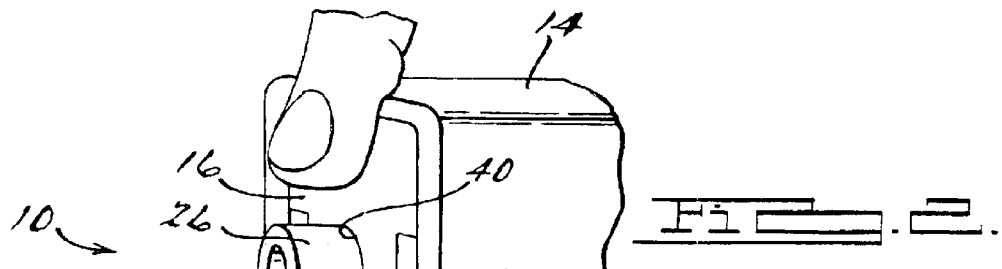
FIG. 2 is a partial perspective view illustrating the auto-locking end cap of FIG. 1 in a partially assembled state.

Turning to FIG. 2, there is shown a partial perspective view of assembly 10, to the exclusion only of cap body 12. FIG. 2 illustrates end plate 16 partially retracted relative to extension 26, compressing coil spring 20 and extending extension 26 through aperture 40 from end plate 16, exposing cutout 27. Also pictured is securing member 22, which preferably includes an arcuate portion 23 and a mounting plate 21. In a preferred embodiment, as illustrated in FIG. 2, cutout 27 is substantially complementary to at least a portion of securing member 22, and can be hooked thereto. It should be appreciated, however, that the disclosed designs of cutout 27 and securing member 22 are not limiting and "substantially complementary" should be broadly construed. For instance, rather than a mating cutout and arcuate section as shown, extension 26 might include a hook or loop at the end. Similarly, securing member 22 could differ significantly from the disclosed embodiments. For example, securing member 22 could be O-shaped, D-shaped, or could be some other configuration without departing from the scope of the present invention. Mounting plate 21 is preferably flat and should include a plurality of holes 25 for mounting securing member 22 to a vehicle interior member with screws or bolts (not shown). Rather than arcuate portion 23, it should be appreciated that securing member 22 might have a different shape, for example a square or rectangular loop portion and a mounting plate. As another alternative, securing member 22 might be integrally molded with a vehicle interior member, or it might be attached by some other method.

Figure 3:
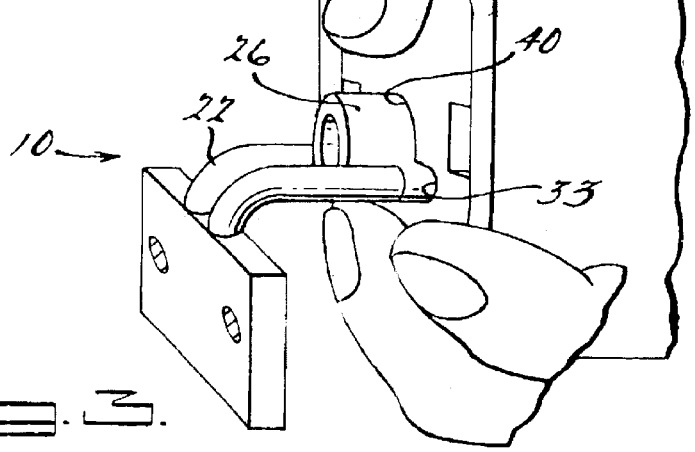
FIG. 3 is a partial perspective view similar to FIG. 2.
Figure 7:
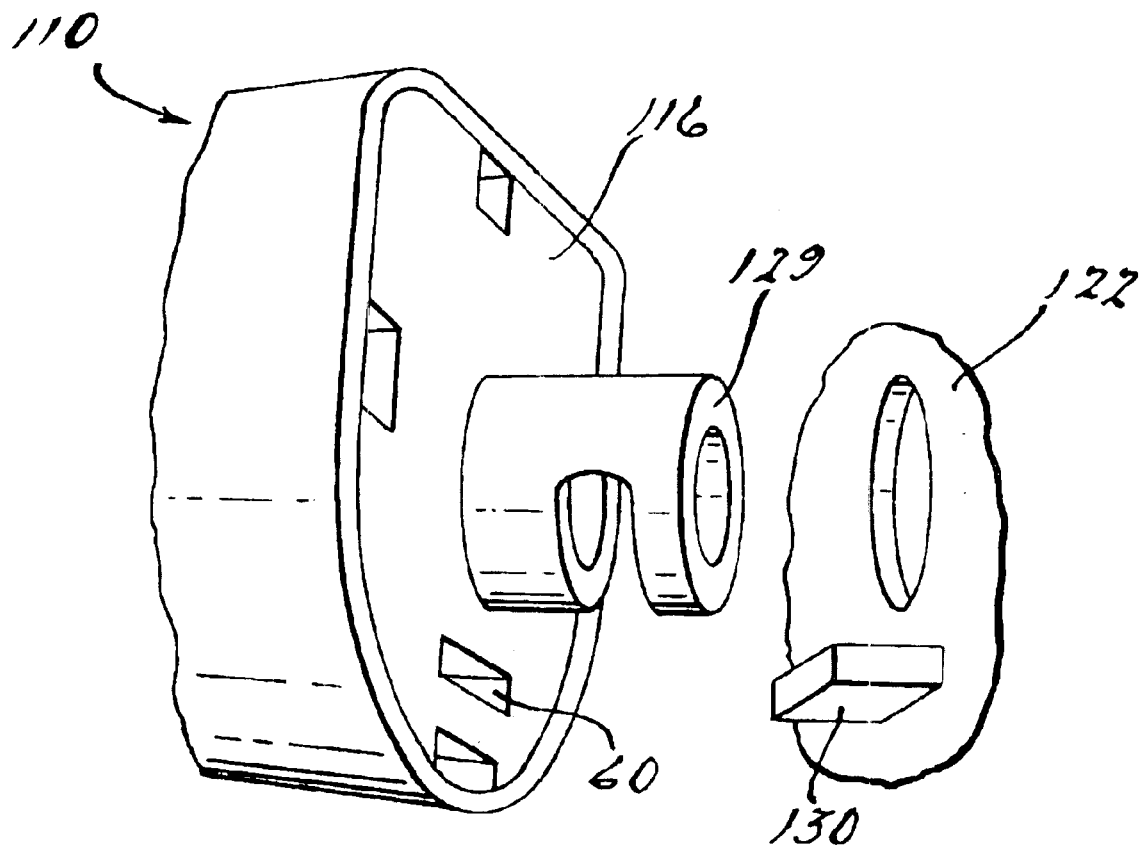

FIG. 3 is a close-up view showing extension 26 with cutout region 27 matingly engaged with securing member 22. A set of positioning slots 33 are preferably included in end plate 16, and are preferably in communication with the central aperture 40. Because end plate 16 is biased by coil spring 20, end plate 16 and thus cap body 12 are continuously urged toward the extended position, giving end plate 16 and thus its positioning slots 33 the tendency to engage the arcuate portion of securing member 22 when appropriately positioned (i.e. when extension 26 has engaged securing member 22). Thus, when manual pressure is released from end plate 16, cap body 12 moves under the action of coil spring 20 to position slots 33 around securing member 22, reaching its fully extended position when end plate 16 is substantially flush with anterior end 29 of extension 26, and lips 41 and 43 are engaged. The locking interface of securing member 22 with extension 26 and end plate 16 resists rotation of cap body 12 and its components relative to securing member 22, and also prevents lateral displacement of end cap 12 and the associated roller shade assembly. FIG. 4 illustrates securing member 22 in locking engagement with coupling member 14 and cap body 12 at its extended position. The foregoing embodiment preferably includes a securing member that interfaces with both a finger member and a slot in the cap body's end plate. Alternative embodiments are contemplated, however, in which the securing member is engageable with a finger member, but a separate locking piece located on a vehicle interior member mates to a slot in the end cap.

Installation of a vehicle security shade assembly employing the present invention preferably begins by engaging one end cap assembly to a vehicle interior member. In a preferred embodiment, only one end cap assembly according to the present invention is necessary, however, two such end cap assemblies might also be used. The first of two cap assemblies can include any known mounting attachment, such as a hook, and is secured to a mate in the vehicle interior. Once the first end is secured, the second end, i.e. end cap assembly 10, should be compressed axially, making the cutout region 27 of extension 26 accessible. Then, the end cap assembly 10 and associated shade assembly can be moved into a position to engage cutout 27 with securing member 22. Once cutout 27 is mated with the complementary portion of securing member 22, the axial pressure on cap body 12 can be released, allowing cap body 12 and thus end plate 16 to move toward the extended position under the influence of spring 20, engaging slots 33 with securing member 22. Because a hook or similar attachment can be attached to the shade spindle opposite end cap 10 with which "play" or axial movement is possible between the shade and the trim panel, both of the disclosed embodiments of the present invention, and their various permutations, are applicable to vehicles having varying interior widths. As spring-loaded end cap 10 (or end cap 110, described below) engages a trim panel, the biasing force on the end cap secures the entire shade assembly in place.

Because biasing spring 20 continuously urges the end cap toward its extended position, engagement of slots 33 with securing member 22 takes place automatically, and securing of the roller shade assembly against axial rotation and dislodging is also automatic. All that is necessary to lock the end cap (and its associated shade) against movement and rotation is retraction of the end cap and engagement of cutout 27 with securing member 22. Thus, the present invention provides a mechanism superior to earlier designs, in which various locking methods required an additional step after mounting of the shade body. Similarly, removal of the shade assembly is facilitated by the present design. Rather than requiring the disengagement of a separate locking mechanism, it is only necessary to axially compress the end cap, and lift the assembly to disengage it from its mounting position. In an embodiment having two end caps according to the present invention, installation and removal would proceed similarly, however, both end caps would be simultaneously compressed, and engaging/disengaging of the cap assemblies with their respective securing members would preferably take place at substantially the same time. It should be appreciated that the presently described installation scheme might be varied without departing from the scope of the present invention.

Referring to FIG. 5, there is shown a second embodiment of an auto-locking end cap assembly 110 according to the present invention. Assembly 110 has a number of similarities to the previously described embodiments, yet significant distinctions. Similar to end cap assembly 10, assembly 110 includes a cap body 112 with an end plate 116. A coupling member with an anterior end 129 is positioned in cap body 112, and protrudes from end plate 116 when cap body 112 is moved from an extended position (FIG. 5) to a retracted position (FIG. 6), in a manner similar to end cap assembly 10. End cap assembly 110 differs from previously described end cap assembly 10, however, in the manner in which the end cap is fixed against axial rotation and lateral displacement. In addition, the locking function of end cap assembly 110 is preferably achieved prior to cap body 112 reaching its fully extended position. Rather than engaging a remote securing member with a receiving slot in the end cap, assembly 110 is secured by engaging a finger 130 or boss located on the cap body 112 with a substantially complementary receiving cavity or slot (not shown) in a securing member. attached to a vehicle interior member, or engaging the boss 130 with a cavity in the interior member itself.

Installation of a shade assembly employing cap assembly 110 takes place in a manner similar to that described with respect to cap assembly 10. Manual axial pressure is applied to cap body 112, overcoming the force of an internal biasing spring (not shown), and exposing cutout 127. The shade assembly (not shown) is then positioned to engage cutout 127 with a securing member 122. Next, the manual axial pressure is released, and cap body 112 is urged outward, preferably bringing boss 130 into mating engagement with a slot 131 (not shown) in securing member 122. End cap assembly 110 is thus locked against rotation and lateral movement by the interface of extension 130 with its mating slot (not shown).

In both embodiments 10 and 110 no buttons or levers are required to disengage or engage the locking effect of the present end cap assembly, and the endcap itself does not need to be "detented," or prevented from moving to lock the shade assembly in place. Installation and removal thus take place quite quickly and easily. The shade assembly is locked into place upon releasing axial compression of the end cap(s), thereby preventing both up/down movement, and cross-car detachment. Furthermore, the accompanying shade assembly cannot be installed without invoking the automatic locking feature, and it is thus highly unlikely that the shade will be improperly installed and subsequently dislodge during vehicle operation or loading.

It should be understood that the present description is for illustrative purposes only and should not be construed to limit the breadth of the present invention in any way. Thus, those skill in the art will appreciate that various modifications and alterations could be made to the disclosed embodiments without departing from the spirit and scope of the invention. Although the present invention has been described in the environment of an interior vehicle storage area, the design would be useful in alternative applications, for instance, in mounting a pick-up truck bed cover or extensible cover for loose loads in larger vehicles, such as gravel trucks, etc. Other aspects, features, and advantages of the present invention will be evident upon an examination of the attached drawing figures and appended claims.

What is claimed:

1. An end cap assembly for an extensible compartment barrier in a vehicle comprising:
    a cap member movable axially from a first position to a second position;
    a biasing member biasing said cap member toward said first position;
    a finger member at least partially within said cap member, and defining a recess proximate an anterior end of said finger member, said anterior end protruding from an end face of said cap member at said second position;
    a mounting member having a region formed substantially complementary to said recess;
    said cap member engageable with said mounting member at said first position, a portion of said mounting member matingly engaging a slot defined by said end face of said cap member.

2. The end cap assembly of claim 1 wherein said slot is partially coextensive with an aperture in said cap body.

3. The end cap assembly of claim 2 wherein said mounting member is at least partially arcuate.

4. The end cap assembly of claim 3 wherein an arcuate portion of said mounting member is engageable with said recess on said finger member, and matingly engageable with said slot.

5. The end cap assembly of claim 1 wherein a first portion of said mounting member is engageable with said recess, and a second portion of said mounting member is engageable with said slot.

6. An end cap for a vehicle roller shade assembly comprising:

a cap body having a tab protruding from an end face, said cap body reciprocable between an extended position and a retracted position;

a finger member fixed relative to said cap body and defining a recess, said recess within said cap body at said extended position, and without said cap body at said retracted position;

said recess is engageable with a clasp member attached to a vehicle trim panel at said retracted position;

a biasing member biasing said cap body toward said extended position wherein said tab is engageable with an aperture defined by a vehicle interior trim member, thereby rotationally and laterally fixing said cap body.

7. The end cap of claim 6 wherein said clasp member is formed integrally with a vehicle trim panel.

8. A roller assembly for an extensible member for a storage compartment of a vehicle comprising:

a rotatable spindle attached to a flexible security member;

at least one mounting cap mounted at an end of said rotatable spindle and having a cap body with an end plate, said cap body reciprocable between a retracted position and an extended position;

a coupling member positioned at least partially within said cap body, said coupling member defining a cutout region proximate a first end, said first end and said cutout region protrude from said end piece at said retracted position;

a securing member affixed to a vehicle interior structure, said securing member including a region engageable with said cutout region;

a biasing member biasing said cap body toward said extended position;

locking means including a first element located on a vehicle trim panel, and a second element located on said cap body, said elements engageable in a substantially mating relationship, securing said assembly in a vehicle storage compartment.

9. The roller assembly of claim 8 wherein said locking means includes a fixing member and a cavity defined by one of said securing member and said mounting cap.

10. The roller assembly of claim 9 wherein said fixing member is a boss attached to a vehicle trim panel;

said cavity located in said end cap and substantially complementary to said boss;

a mating of said boss with said cavity prevents movement of said end cap at said extended position.

11. The roller assembly of claim 9 wherein said fixing member is a boss protruding from said end cap;

said cavity is located in a vehicle interior structure and is substantially complementary to said boss;

a mating of said boss with said cavity prevents movement of said end cap at said extended position.

12. The roller assembly of claim 8 wherein said end piece is a substantially flat end plate having a central aperture;

a portion of said coupling member passes through said aperture when said end cap is reciprocated between said extended and said retracted positions.

13. The roller assembly of claim 8 wherein said locking means comprises a plurality of slots defined by said end cap adjacent said aperture, and further comprising:

a fixing member with an arcuate portion receivable in said slots at said extended position, an interface of said fixing member with said slots prevents movement of said end cap.

14. The roller assembly of claim 8 wherein said fixing member is integral with said securing member.

15. The roller assembly of claim 8 wherein two mounting caps are attached to said spindle.

16. The roller assembly of claim 8 wherein a mounting cap is affixed to a first end of said spindle, and a hook member is affixed to a second end of said spindle.

* * * * *